United States Patent [19]
Kojima et al.

[11] Patent Number: 5,499,115
[45] Date of Patent: Mar. 12, 1996

[54] TELEVISION RECEIVING APPARATUS HAVING A VIDEO TAPE RECORDER UNIT THEREIN WITH A FUNCTION FOR PREVENTING AN ELECTRIC SHOCK

[75] Inventors: Kazunobu Kojima, Tsuzuki; Takashi Kagawa, Suita; Yuichi Matsuoka, Takatsuki, all of Japan

[73] Assignee: Matsushita Electric Industrial Co., Ltd., Osaka, Japan

[21] Appl. No.: 285,141

[22] Filed: Aug. 3, 1994

[30] Foreign Application Priority Data

Aug. 17, 1993 [JP] Japan ..................................... 5-203050

[51] Int. Cl.⁶ .................................................. H04N 5/64
[52] U.S. Cl. ........................... 348/836; 348/839; 348/843
[58] Field of Search ........................... 348/836, 837–843, 348/552; D14/126, 129, 133

[56] References Cited

U.S. PATENT DOCUMENTS

| | | | |
|---|---|---|---|
| D. 308,378 | 6/1990 | Shinoda | D14/133 |
| 4,755,881 | 7/1988 | Bartlett | 358/254 |
| 4,831,449 | 5/1989 | Kimura | 358/198 |
| 5,121,268 | 6/1992 | Nakayama et al. | 360/71 |
| 5,210,603 | 5/1993 | Sabin | 358/93 |

FOREIGN PATENT DOCUMENTS

| | | |
|---|---|---|
| 0121251A2 | 10/1984 | European Pat. Off. . |
| 0401475A3 | 12/1990 | European Pat. Off. . |
| 0505938A1 | 9/1992 | European Pat. Off. . |
| 2375799 | 7/1978 | France . |
| 8506998 | 6/1985 | Germany . |
| 3444285A1 | 6/1986 | Germany . |
| 469995A | 3/1992 | Japan . |
| 4188972A | 7/1992 | Japan . |
| 4196882A | 7/1992 | Japan . |

OTHER PUBLICATIONS

Crutchfield (Winter–Spring 1995) p. 108.

Primary Examiner—Edward L. Coles, Sr.
Assistant Examiner—Allan A. Esposo
Attorney, Agent, or Firm—Stevens, Davis, Miller & Mosher

[57] ABSTRACT

A television receiving apparatus having a video tape recorder unit therein with a function for preventing an electric shock, for preventing a user from inserting his fingers into a cabinet when the video tape recorder unit is removed from the cabinet for repair or the like, includes a locking mechanism for locking a controller door panel at a position where it is closed. The controller door panel is used for operating the video tape recorder unit contained in the apparatus. In order to surely obtain security of the user even when the locking operation is forgotten, the apparatus further includes a mechanism for interrupting supply of electric power to a television receiver when the absence of the video tape recorder unit in the cabinet is detected and when the controller door panel is detected to be opened at and more than a predetermined angle. A possibility that the user will receive an electric shock can thus be eliminated.

16 Claims, 2 Drawing Sheets

TELEVISION RECEIVING APPARATUS HAVING A VIDEO TAPE RECORDER UNIT THEREIN WITH A FUNCTION FOR PREVENTING AN ELECTRIC SHOCK

FIELD OF THE INVENTION

The present invention relates to a television receiving apparatus having a video tape recorder unit therein, which apparatus is structured to eliminate a risk that a user will receive a dangerous electric shock.

BACKGROUND OF THE INVENTION

In a conventional television receiving apparatus accommodating a video tape recorder unit therein, a tuner device and an audio system used for a television receiver are often incorporated in the video tape recorder unit. Accordingly, when the video tape recorder unit is absent in a cabinet of the apparatus because of repair, for example, the television receiver cannot receive television broadcasting.

In contrast, in a television receiving apparatus having a video tape recorder unit therein according to the present invention, a television receiver itself including a tuner device and an audio system, and a video tape recorder unit are accommodated in a common cabinet. It is therefore possible to receive the television broadcasting by the television receiver even if the video tape recorder unit is not present in the cabinet.

In this case, however, when a user who does not know the absence of the video tape recorder unit in the cabinet, tries to use the video tape recorder unit during operation of the television receiver, there is a risk that the user will undesirably insert his fingers into the cabinet and receive an electric shock.

SUMMARY OF THE INVENTION

It is an object of the invention to provide a television receiving apparatus having a video tape recorder unit therein which can eliminate the risk of the electric shock as mentioned above.

According to a first aspect of the invention, to achieve the object, a television receiving apparatus having a video tape recorder unit therein according to the invention, comprises: a cabinet; an independent television receiver housed in the cabinet, and including a tuner device and an audio system; a video tape recorder unit detachably accommodated in the cabinet, connected to the television receiver and having an opening portion through which a video tape cassette is inserted or discharged; a controller door panel provided on the cabinet and adapted to open or close in correspondence to the opening portion of the video tape recorder unit; and means for locking the controller door panel in the cabinet at a position where it is closed.

The television receiving apparatus having a video tape recorder unit therein may further include first detection means for detecting absence of the video tape recorder unit in the cabinet, second detection means for detecting that the controller door panel is opened at and more a predetermined angle and means for interrupting supply of electric power to the television receiver when the first detection means detects the absence of the video tape recorder unit in the cabinet and the second detection means detects that the controller door panel is opened at and more the predetermined angle.

In the above-described structure, when taking out the video tape recorder unit from the cabinet for repairing the same, a service man operates the means for locking the controller door panel which is provided for operating the contained video tape recorder unit, at the closed position, so that the controller door panel can be maintained in a closed state. Since the user is thus prevented from inserting his fingers into the cabinet, a risk that he will receive an electric shock can be removed.

The television receiving apparatus of the invention may further include first means for detecting the absence when the video tape recorder unit is not present in the cabinet, second detection means for detecting that the controller door panel is opened at and more a predetermined angle and means for interrupting supply of electric power to the television receiver when the first detection means detects the absence of the video tape recorder unit in the cabinet and the second detection means detects that the controller door panel is opened at and more the predetermined angle. Therefore, even if the service man forgets to lock the controller door panel at the closed position, it is possible to eliminate the risk that the user will unfavorably be exposed to the electric shock.

According to a second aspect of the invention, a television receiving apparatus having a video tape recorder unit therein according to the invention, comprises: a cabinet; a television receiver housed in the cabinet, and including a tuner device and an audio system installed therein; a video tape recorder unit detachably accommodated in the cabinet, connected to the television receiver and having an opening portion through which a video tape cassette is inserted or discharged; a controller door panel provided on the cabinet and adapted to open or close in correspondence to the opening portion of the video tape recorder unit; first detection means for detecting absence of the video tape recorder unit in the cabinet; second detection means for detecting that the controller door panel is opened at and more a predetermined angle; and means for interrupting supply of electric power to the television receiver when the first detection means detects the absence of the video tape recorder unit in the cabinet and the second detection means detects that the controller door panel is opened at a predetermined angle.

According to the television receiving apparatus of the present invention, it includes the first detection means for detecting the absence of the video tape recorder unit when it is not present in the cabinet and the means for interrupting the supply of electric power to the television receiver when the second detection means detects that the controller door panel is opened at and more the predetermined angle. Therefore, a danger of an electric shock which happens to the user can be eliminated.

DETAILED DESCRIPTION OF THE EMBODIMENT

Figure 1:
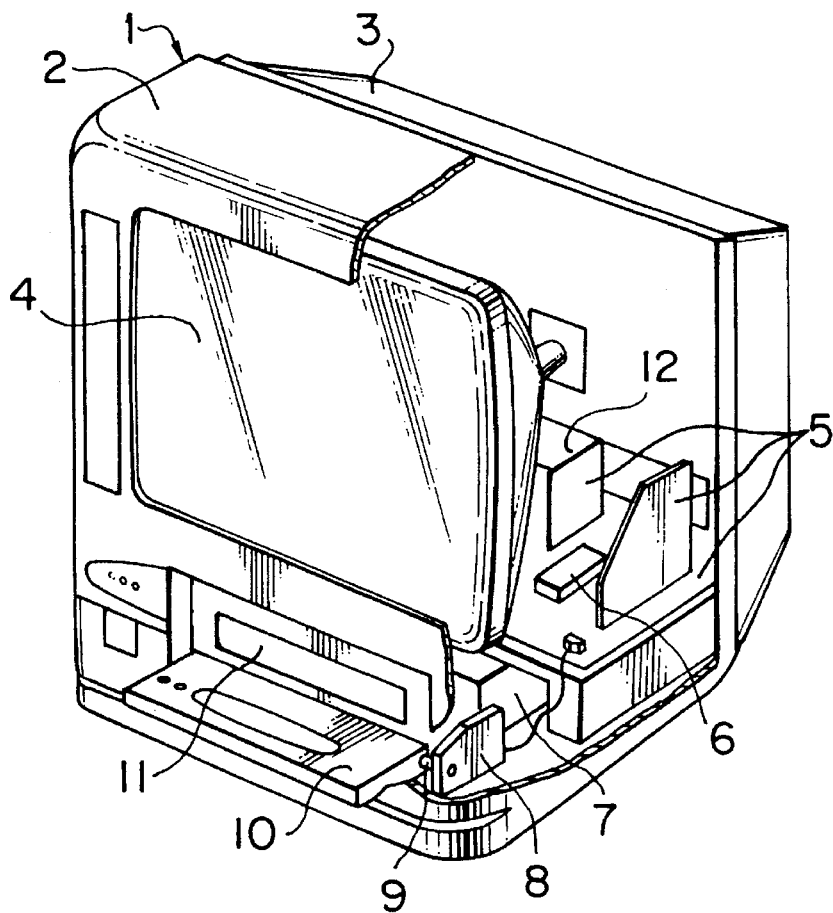
FIG. 1 is a partially cutaway perspective view of a television receiving apparatus having a video tape recorder unit therein according to one embodiment of the present invention.

FIG. 1 shows an embodiment of a television receiving apparatus 1 having a video tape recorder unit therein, according to the present invention. A cabinet 2 accommodates a television receiver 4 having a cathode-ray tube, and a video tape recorder unit 7. This television receiver 4 itself includes a tuner device and an audio system independently of the video tape recorder unit, and accordingly, when the video tape recorder unit 7 is removed from the cabinet 2, the television receiver 4 can receive television broadcasting by itself.

The video tape recorder unit 7 has an opening portion 11 on the front side through which a video tape cassette is inserted into or discharged from the unit. A user opens a controller door panel 10 of the cabinet 2 to expose the opening portion 11 for inserting or discharging the video tape cassette therethrough. When it is required to take out the video tape recorder unit 7 from the cabinet 2 for the purpose of repairing the unit when a problem develops therein a service man opens a cover (not shown) of a rear casing portion 3 of the cabinet 2 to release the connection between the video tape recorder unit 7 and the television receiver 4 before the video tape recorder unit 7 is removed from the cabinet 2.

When the video tape recorder unit 7 is disconnected from the television receiver 4, an information of the disconnection is given to a microcomputer 6 as, for example, a change in voltage of electrical connection terminals. The microcomputer 6 which has detected the above disconnection, recognizes that the video tape recorder unit 7 has been removed from the cabinet 2, or that the video tape recorder unit 7 is absent in the cabinet 2.

Figure 2:
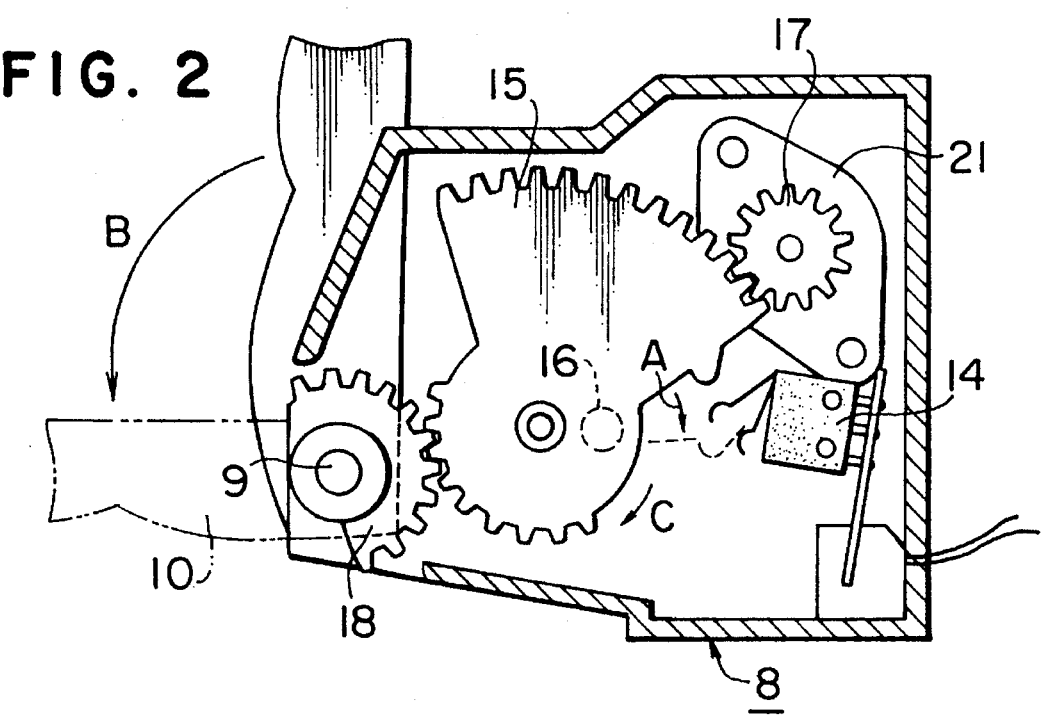
FIG. 2 is a view illustrative of a door mechanism for a controller door panel of the embodiment shown in FIG. 1.

The controller door panel 10 is swingably rotated about a shaft 9. The shaft 9 is operatably connected to a door mechanism 8, as shown in FIG. 2. When the controller door panel 10 is moved, a first gear 18 is rotated and a second gear 15 engaged with the first gear 18 is also rotated. A third gear 17 meshed with the second gear 15 is coupled to a damper mechanism 21 having an oil-contained dash pot. The damper mechanism 21 controls movement of the gear trains to thereby adjust a velocity of movement of the controller door panel 10 appropriately.

Referring to FIG. 2, when the controller door panel 10 is moved in a direction of an arrow B at a predetermined angle from a position where it is closed, which is shown by a solid line, the second gear 15 rotates in a direction of an arrow A and after rotating a given amount, pushes a limit switch 14. Information that the limit switch 14 has been pushed as the second detection means is sent to the microcomputer 6 illustrated in FIG. 1 so that the supply of electric power to the television receiver 4 is interrupted by the microcomputer 6 if the video tape recorder unit 7 is absent in the cabinet 2. However, when the video tape recorder unit 7 is present in the cabinet 2, the microcomputer 6 does not shut off the supply of the electric power to the television receiver 4 in response to the information that the limit switch 14 has been pushed.

In the above-described embodiment, the microcomputer 6 is used as the first detection means for detecting that the video tape recorder unit 7 is absent in the cabinet 2. In the case where the video tape recorder unit 7 is not present in the cabinet 2, when the controller door panel is opened at and more than the predetermined angle so as to cause second gear 15 to push the limit switch, the microcomputer 6 also serves as means for interrupting the supply of electric power to the television receiver 4. Alternatively, those means may be replaced by any other similarly functioning means such as only a limit switch.

Figure 3:
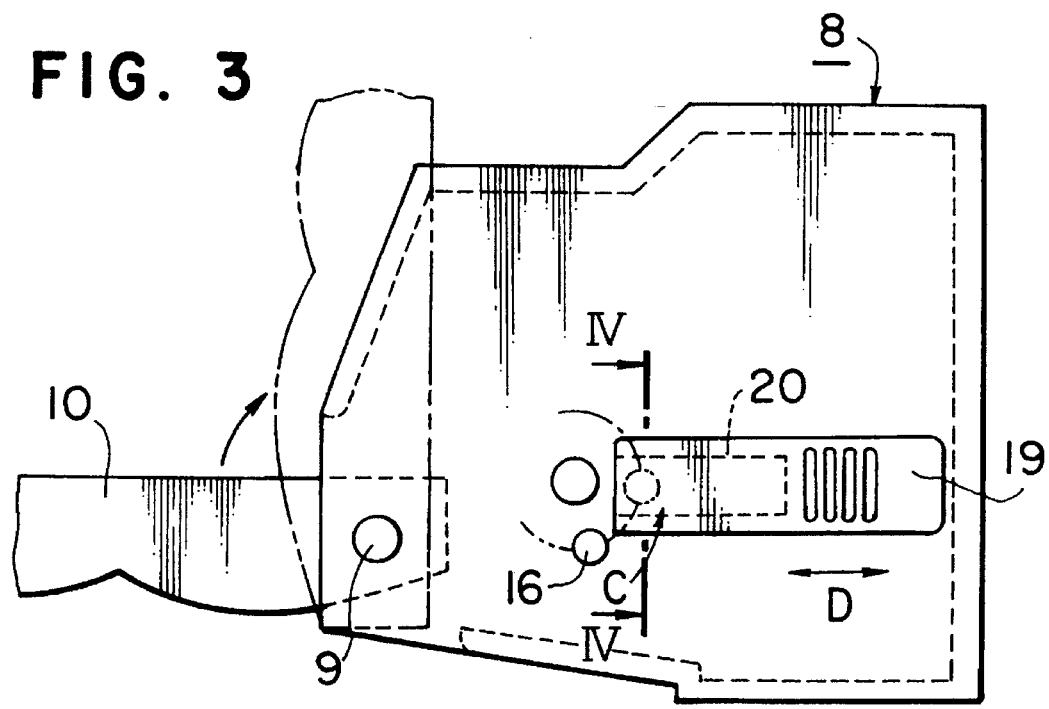
FIG. 3 is a view of the same, schematically showing a structure of locking the controller door panel of the embodiment shown in FIG. 1.

Referring to FIG. 3, the second gear 15 is provided with a projection 16. In order to facilitate the understanding of the invention, the gear trains are positively omitted from FIG. 3, except for the projection 16. As shown in FIG. 3, when the controller door panel 10 is at a position where it is opened, which is indicated by an imaginary line, the projection 16 occupies a position indicated by an imaginary line. When the controller door panel 10 is at a position where it is closed, which is indicated by a broken line, the projection 16 occupies a position indicated by a broken line.

Figure 4:
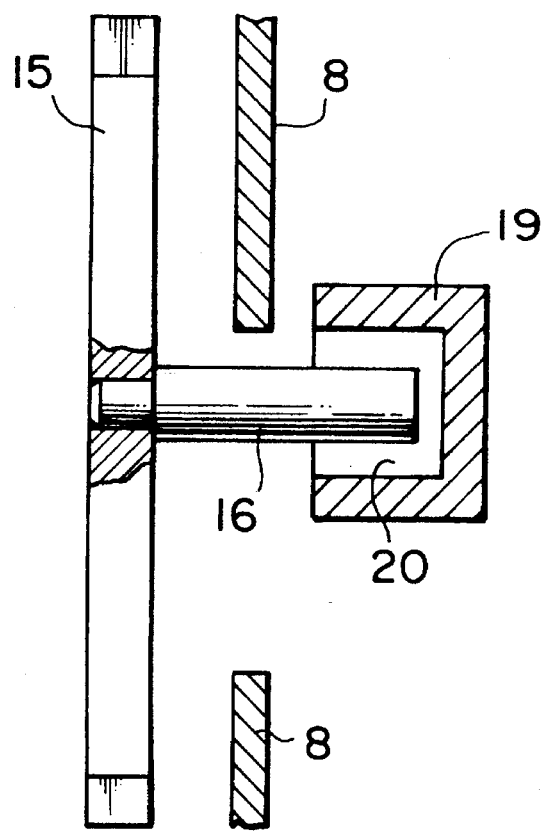
FIG. 4 is a cross-sectional view of the door mechanism and a hold member in the embodiment of FIG. 1, taken along a line IV—IV of FIG. 3, when the operation door panel is locked.

A hold member 19 having a relatively narrow groove 20 is connected to the door mechanism 8 slidably in a direction of an arrow D. When the projection 16 is at the position indicated by the broken line, or when the controller door panel 10 is at the closed position, the hold member 19 retains the projection 16 in the groove 2 so that the projection 16 cannot move, as shown in FIG. 3. As a result, the controller door panel 10 is locked at that closed position. FIG. 4 is a cross-sectional view of the door mechanism 8 and the hold member 19, taken along a line VI—VI of FIG. 3, in which the projection 16 is held in the groove 20.

As mentioned above, when there happens some trouble to the video tape recorder unit, the service man takes out the video tape recorder unit from the cabinet for repairing the same. Since the television receiver is independent of the video tape recorder unit, the television receiver can receive the television broadcasting by itself.

However, when a user does not know or forgets the absence of the video tape recorder unit in the cabinet, and opens the controller door panel to use the video tape recorder unit, he may insert his fingers into the cabinet during operation of the television receiver. In such a case, there is a possibility that he will unfavorably touch a chassis of the television receiver or an electric circuit. This mistouch gives an electric shock to the user.

In order to eliminate the dangerous electric contact, according to the invention, the television receiving apparatus having a video tape recorder unit therein includes the two means which has been described above.

More specifically, one of those means serves to lock the controller door panel at the closed position. That is to say, when the service man removes the video tape recorder unit from the cabinet, the controller door panel can be locked at the closed position by the service man. Thus, since the user is prevented from inserting his fingers into the cabinet by error, he will not receive the electric shock.

The other means serves to detect the absence of the video tape recorder unit in the cabinet and to interrupt the supply of electric power to the television receiver when the controller door panel is opened at and more than the predetermined angle.

That is to say, as shown in FIG. 2, when the controller door panel is opened, the second gear 15 movably engaged with the controller door panel pushes the limit switch 14. In the case where the microcomputer 6 (see FIG. 1) detects the absence of the video tape recorder unit in the cabinet, when the limit switch 14 is pushed, the microcomputer 6 interrupts the supply of electric power to the television receiver. Therefore, even if the service man forgets to lock the controller door panel at the closed position, there is no possibility that the user will receive the electric shock.

What is claimed is:

1. A television receiving apparatus having a video tape recorder unit therein with a function for preventing an electric shock, comprising:

a cabinet;

an independent television receiver housed in said cabinet and including a tuner device and an audio system;

a video tape recorder unit detachably accommodated in said cabinet, connected to said television receiver, and having an opening portion through which a video tape cassette is inserted or discharged;

a controller door panel provided on said cabinet and positioned to open or close in front of the opening portion of said video tape recorder unit; and means for locking said controller door panel in said cabinet at a closed position where said controller door panel is closed relative to said cabinet, wherein said means for locking the controller door panel includes (i) a member which is movable in association with an opening/closing movement of the controller door panel relative to said cabinet and which has at least one projection and (ii) a hold member having a groove for retaining said projection therein, said controller door panel being locked at said closed position when said projection is retained in said groove.

2. A television receiving apparatus having a video tape recorder unit therein according to claim 1, wherein at least a part of said movable member includes a toothed portion.

3. A television receiving apparatus having a video tape recorder unit therein according to claim 2, wherein said apparatus further comprises a shock absorber for adjusting a velocity of opening or closing movement of said controller door panel relative to said cabinet in cooperation with the toothed portion of the movable member included in said lock means.

4. A television receiving apparatus having a video tape recorder unit therein according to claim 1, wherein said apparatus further comprises first detection means for detecting absence of said video tape recorder unit in said cabinet, second detection means for detecting opening of said controller door panel at more than a predetermined angle relative to said cabinet and means for interrupting supply of electric power to said television receiver when said first detection means detects the absence of the video tape recorder unit in said cabinet and said second detection means detects that said controller door panel is opened at more than the predetermined angle relative to said cabinet.

5. A television receiving apparatus having a video tape recorder unit therein according to claim 4, wherein said first detection means for detecting the absence of the video tape recorder unit in said cabinet is a microcomputer.

6. A television receiving apparatus having a video tape recorder unit therein according to claim 5, wherein said second detection means for detecting that said controller door panel is opened at more than the predetermined angle relative to said cabinet comprises a limit switch.

7. A television receiving apparatus having a video tape recorder unit therein according to claim 6, wherein at least a part of said movable member includes a toothed portion.

8. A television receiving apparatus having a video tape recorder unit therein according to claim 7, wherein said apparatus further comprises a shock absorber for adjusting a velocity of opening or closing movement of said controller door panel relative to said cabinet in cooperation with the toothed portion of the movable member included in said lock means.

9. A television receiving apparatus having a video tape recorder unit therein according to claim 8, wherein said limit switch is turned on or off by movement of the movable member provided in said lock means.

10. A television receiving apparatus having a video tape recorder unit therein with a function for preventing an electric shock, comprising:

a cabinet;

an independent television receiver housed in said cabinet and including a tuner device and an audio system;

a video tape recorder unit detachably accommodated in said cabinet, connected to said television receiver, and having an opening portion through which a video tape cassette is inserted or discharged;

a controller door panel provided on said cabinet and positioned to open or close relative to said cabinet in front of the opening portion of said video tape recorder unit;

an opening or closing mechanism for opening or closing the controller door panel relative to said cabinet;

first detection means for detecting absence of said video tape recorder unit in said cabinet;

second detection means for detecting that said controller door panel is opened at more than a predetermined angle relative to said cabinet; and means for interrupting supply of electric power to said television receiver when said first detection means detects the absence of the video tape recorder unit in said cabinet and said second detection means detects that said controller door panel is opened at more than the predetermined angle relative to said cabinet.

11. A television receiving apparatus having a video tape recorder unit therein according to claim 10, wherein said first detection means for detecting the absence of said video tape recorder unit in said cabinet is a microcomputer.

12. A television receiving apparatus having a video tape recorder unit therein according to claim 11, wherein said second detection means for detecting that said controller door panel is opened at more than the predetermined angle relative to said cabinet is a limit switch.

13. A television receiving apparatus having a video tape recorder unit therein according to claim 12, wherein said opening or closing mechanism of said controller door panel includes a member movable in association with an opening/closing movement of said controller door panel relative to said cabinet.

14. A television receiving apparatus having a video tape recorder unit therein according to claim 13, wherein at least a part of said movable member includes a toothed portion.

15. A television receiving apparatus having a video tape recorder unit therein according to claim 14, wherein said apparatus further comprises a shock absorber for adjusting a velocity of opening or closing movement of said controller door panel relative to said cabinet in cooperation with the toothed portion of the movable member included in said opening or closing mechanism.

16. A television receiving apparatus having a video tape recorder unit therein according to claim 15, wherein said limit switch is turned on or off by movement of the movable member included in said opening or closing mechanism.

\* \* \* \* \*